Aug. 16, 1927.  
J. MASSARELLA  
1,639,263  
CONFECTIONERY COATING MACHINE  
Filed April 3, 1922  
4 Sheets-Sheet 1

Fig. 1.

INVENTOR  
John Massarella  
BY Clarence Perdew  
ATTORNEY

Aug. 16, 1927.

J. MASSARELLA 1,639,263

CONFECTIONERY COATING MACHINE

Filed April 3, 1922    4 Sheets-Sheet 2

INVENTOR
John Massarella
BY Clarence Perlew
ATTORNEY

Aug. 16, 1927.

J. MASSARELLA 1,639,263

CONFECTIONERY COATING MACHINE

Filed April 3, 1922    4 Sheets-Sheet 3

INVENTOR
John Massarella
BY Clarence Perdew
ATTORNEY

Aug. 16, 1927.

J. MASSARELLA

1,639,263

CONFECTIONERY COATING MACHINE

Filed April 3, 1922   4 Sheets-Sheet 4

INVENTOR
John Massarella
BY Clarence Borden
ATTORNEY

Patented Aug. 16, 1927.

1,639,263

UNITED STATES PATENT OFFICE.

JOHN MASSARELLA, OF CINCINNATI, OHIO.

CONFECTIONERY-COATING MACHINE.

Application filed April 3, 1922. Serial No. 549,151.

My invention relates to confectionery machinery, and the objects of my improvement are to increase the durability and reliability of machines of this kind, to make them more effective and uniform in their operation, especially in coating the under sides of the pieces of confectionery, to permit of accurate regulation of the coating operation, and to insure a cleaner and neater product. Other objects are to coat confections with coating materials hitherto not successfully applied by machines of this character, such as icings composed largely of sugar; and to coat confections of materials of a highly sensitive nature, such as frozen materials, with chocolate or other coatings. Other objects will appear in the course of the ensuing description.

I attain these objects by the mechanism illustrated, for example, in the accompanying drawings, in which—

As is common in machines of this character, there is a lower reservoir or tank 1 between the two frame sides 2 (Fig. 1) which holds a supply of coating material. This tank 1 rests in a lower tank 3 supplied with warm water through a pipe 4, and emptied through an outlet 5. A shaft 6 is journaled transversely in the reservoir 1 and carries a series of stirring blades or paddles 7, and also carries a sprocket wheel 8 near the right hand side of the machine. The frame sides 2 extend up from the top of the reservoir, and near their tops have a shaft 9 journaled across the machine, carrying a smaller sprocket wheel 10 near the front of the machine. Just below and to the rear of this shaft, an arm 11 is pivoted to the adjacent frame side 2 and extends up to the rear, to a suspension link 12 passed up through the top 13 of the machine, which top extends from one to the other of the tops of the frame sides 2. On this arm 11 another small sprocket wheel 14 is journaled; and the link 12 has a nut 15 above the top 13, by which the arm 11 may be adjusted up or down, carrying the sprocket wheel 14 therewith. The elevator sprocket chain 16 passes endlessly around the wheels 8, 10 and 14 and carries buckets 17 attached thereto at intervals, to pass down, inverted, at the front, and dip into the contents of the tank or reservoir 1, and then pass up at the rear and over the rear adjustable wheel 14, passing from there in a slightly downwardly inclined direction and emptying into a trough 18 mounted on the frame side 2 below the arm 11.

Figure 1:
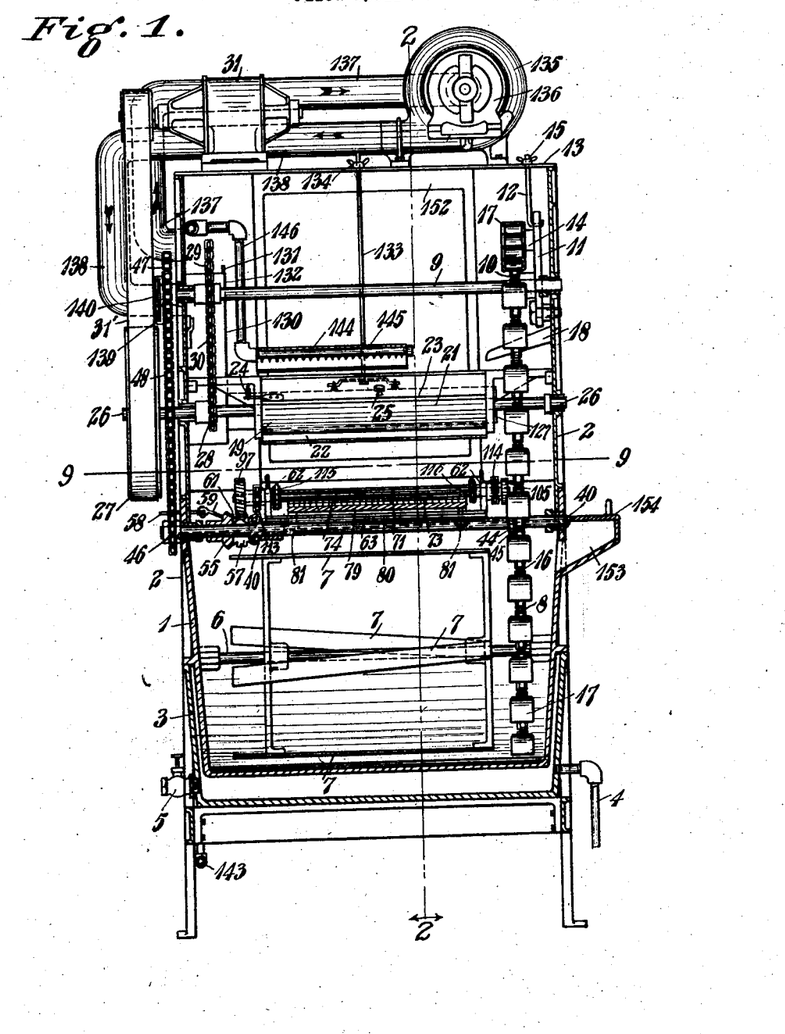
Fig. 1 is a vertical cross-section on the plane of the line 1—1 of Fig. 2.

This trough 18 empties into the fountain 19 which extends across the major part of the interior of the machine and is supported by inwardly extending brackets attached to the respective frame sides 2 and to the adjacent ends of the fountain. The bottom 20 of this fountain 19 inclines downward and forward, and the front of the fountain is omitted to admit a feeding roll 21 journaled in the ends of the fountain and extending across from end to end having its periphery close to the front edge of the bottom 20; which bottom, thereapast, has additional downward inclination and supports an adjustable slide 22 that may be set more or less closely to the surface of the roll 21. Above this roll 21 is a flat leaf 23 extending across from end to end and pivoted, by its rear corner parts, to the upper front corner parts of the fountain ends, from which it inclines downward and forward to rest more or less snugly against the upper surface of the roll 21 accordingly as it is more or less firmly pulled down by a tension spring 24 connected to one corner and stretched back to the adjacent bracket (Fig. 1). The roll 21 preferably is readily accessible for cleaning the device; and to permit this the leaf 23 is lifted by grasping a knob 25 thereon. The shaft 26 by which the roll 21 is journaled in the end brackets, extends out to both sides and is journaled in the frame sides 2, projecting outside at the left (Fig. 1) and having fixed on it the pulley 27. Just inside, at the left, this shaft 26 also has fixed on it a small sprocket wheel 28; and the shaft 9 of the elevator has fixed on it a larger sprocket wheel 29 above the wheel 28; a sprocket chain 30 passing around these two wheels. A motor 31 mounted on the top 13 of the machine has a pulley with a belt 31' passing around the pulley 27.

Figures 2, 3:
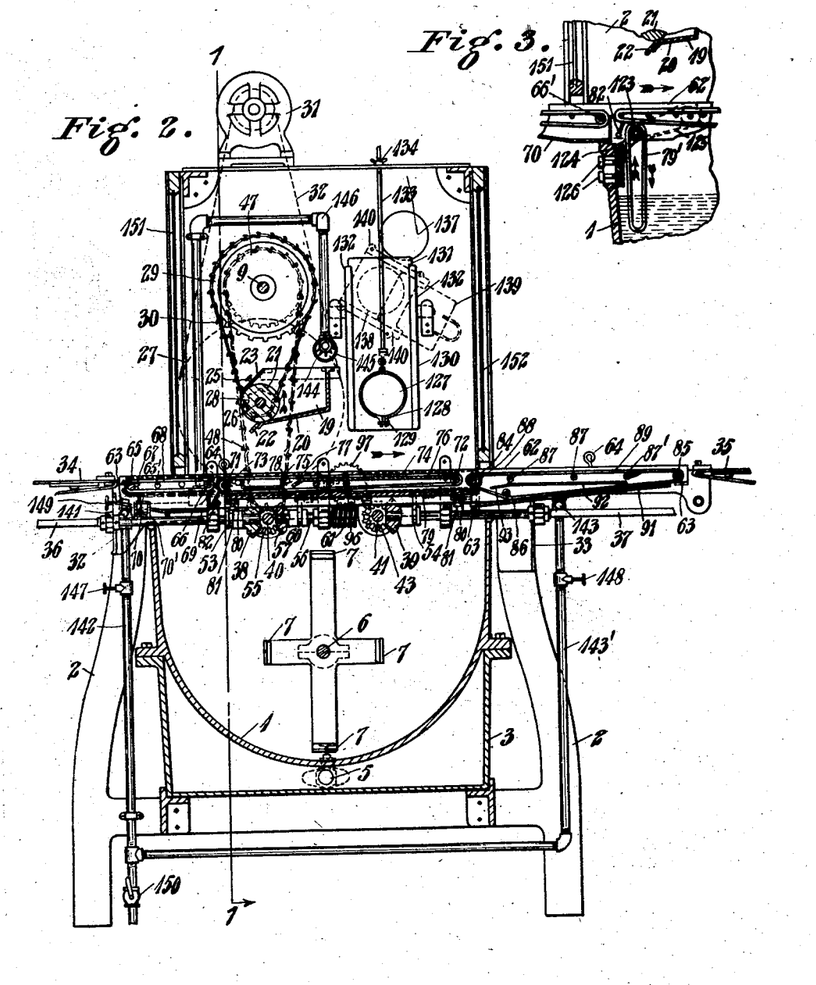
Fig. 2 is a vertical lengthwise section on the plane of the line 2—2 of Fig. 1, looking to the left.
Fig. 3 is a partial similar section, showing a modification of the reapplying device.
Figure 9:
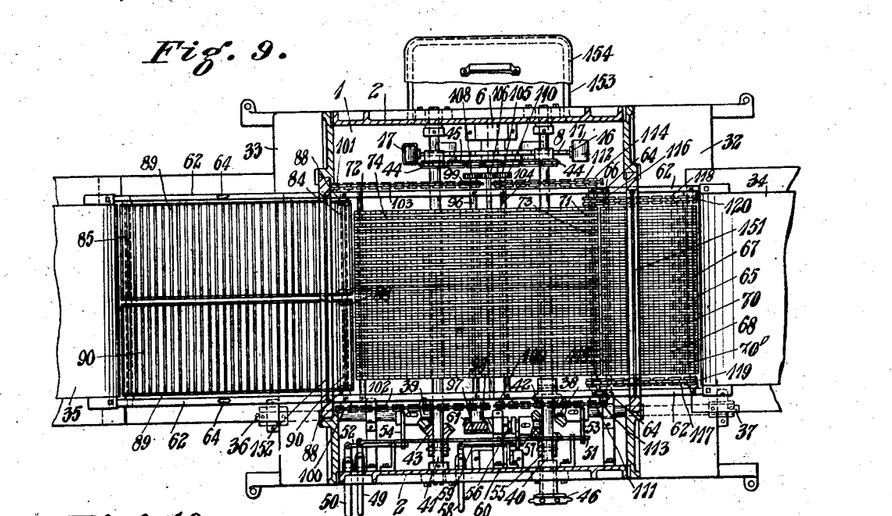
Fig. 9 is a sectional plan view on the plane of the line 9—9 of Fig. 1.

At the front, the frame yoke 32 extends across between and fixed to the frame sides 2; and at the rear, the frame yoke 33 is similarly arranged; this yoke projecting rearwardly for a considerable distance. The front yoke 32 supports the rear end turn of the feed belt 34, only part of which is shown, since this will be understood to be any suitable feed belt such as is well known in the art; and the extended rear end part of the rear yoke 33 similarly supports the front end turn of the delivery belt 35, only partly shown, for the same reason. By suitable mechanism, not shown, the feed belt 34 is driven through the medium of the shaft 36 extending forwardly near the left hand side of the machine; and the delivery belt is similarly driven through the medium of the shaft 37 extending rearwardly at that side. These shafts 36 and 37 are journaled in suitable bearings fixed on the adjacent frame side 2 and have on their inner ends the bevel gears 38 and 39, respectively. Shafts 40 and 41 extend across the machine, journaled in the sides 2, and have bevel gears 42 and 43, meshing with the gears 38 and 39, respectively. At the right hand side, these shafts 40 and 41 carry sprocket wheels 44, with a chain 45 around them; and at the left, outside, the shaft 40 projects and has fixed on it the sprocket wheel 46, above which, on a projection of the elevator shaft 9, is a larger sprocket wheel 47, with a chain 48 passing around the wheel 46, extending between the pulley 27 and frame side 2 and flanking the fountain shaft 26 (Figs. 1 and 2). The gears 38 and 39 are splined on their respective shafts 36 and 37 to slide into and out of mesh with the respective gears 40 and 41, under the action of levers 49 and 50, fulcrumed on the adjacent side 2, and connected to the gears by link rods 51 and 52 and forks 53 and 54, respectively (Fig. 9). The front gear 42 is at the right of its meshing gear 38, and the rear gear 43 is at the left of its meshing gear 39, for proper driving of the feed and delivery belts 34 and 35, respectively.

Next to the side 2, at the left, the front shaft 40 has fixed on it the bevel gear 55, and a worm shaft 56 is journaled lengthwise of the machine in bearings on the frame side 2, with a bevel gear 57 splined on it to mesh with the gear 55 or unmesh therefrom, as moved by a lever 58 fulcrumed on the side 2 and connected to the gear 57 by a link rod 59 and fork 60 (Fig. 9). On this shaft 56 is fixed the worm 61.

The conveyor comprises side frame bars 62 joined by transverse struts 63, making a frame that rests on the yokes 32 and 33 at the front and rear; these yokes being shaped to receive the frame snugly and support it firmly, yet to allow it to be lifted therefrom by grasping the eyes or handles 64 projecting up from the upper edges of the bars 62 near the front and at the rear of the machine.

Near the front ends of the bars 62, a roller bar 65 extends across and is journaled in these bars 62; and some distance rearward another roller bar 66 is similarly journaled. The front roller bar 65 has a transverse series of sprocket wheels 67 (Figs. 2 and 4) each with an endless sprocket chain 68 passing around and meshing with it and passing around the rear roller bar 66. Intermediate roller bars 65' are journaled similarly to the bars 65 and 66 to support the upper stretches of the chains 68. This construction constitutes the first conveyor section, the purpose of which is to receive the confections A (Fig. 11) in their uncoated condition from the feed belt 34, and carry them for a short distance, and, by the shaking of the chains, which is a natural result of the operation of sprocket chains in the construction described, to shake off undesirable substances, such as dust or particles of sugar or starch, from the confections before they are subjected to coating. To catch these substances thus shaken off, a trough 69 is mounted between the conveyor frame bars 62. A wick 70 in a vessel 70' of water, moistens the chains 68.

The above described first or dusting section ends a little forward from the front or discharge side of the fountain 19; and is there succeeded by the second or coating section of the conveyor. This section is constructed substantially the same as the above described first section; comprising the front roller bar 71 and rear roller bar 72; the front bar having the sprocket wheels 73, and chains 74 passing around and meshing with these wheels and passing around the rear bar 72. This second or coating section is much longer, however, extending almost to the rear yoke 33. Just to the rear of the front roller or driving bar 71, a small trough or tray 75 lies under the upper stretches of the chains 74, about where substance from the fountain 19 drops onto the upper surfaces of these chain stretches; and at the rear of this tray 75, which extends back only a short distance, is a shield plate 76 lying up close to the lower sides of these upper chain stretches, with its front end part 77 inclined down and spaced back from the rear end of the tray 75, and the rear end of this plate 76 lying close to the rear roller bar 72. Additional roller bars 78 are journaled across under the upper chain stretches to support them at front and rear of the tray 75; the remainder of the lengths being supported by the plate 76.

Below this second or coating section is a distributing plate or element 79, which, as here shown, is continuous from end to end (Figs. 2 and 4) and from side to side (Fig. 1) of the series of chains making up this conveyor section. The sprocket wheels 73, at the front, are of greater diameter than the rear roller bar 72, so that, the upper stretches of the chains being horizontal, their lower stretches incline up slightly from front to rear. The distributing plate 79 is adjusted to be substantially horizontal, on cross support bars 80 fixed to the conveyor frame side bars 62, by means of adjusting screws 81 extending up through the support bars 80 into recesses near the four corners of the plate 79 (Fig. 11) and this plate is adjusted to such a height, in this manner, that its front end part lies up very close to the chains 74 as they pass up around the sprocket wheels 73 and rearwardly into their upper stretches. A scraper 82 is fixed on a bar journaled in the sides 62 and held fixed by a set screw 83 (Fig. 11) so that this scraper 82 may more or less closely approach the upward passing chains. Also, the rear end of the dust trough 69 extends up between these chains 74 and the chains 68 of the first or dusting section, preventing dust from getting on the coating chains 74 and preventing coating material from getting from the chains 74 onto the dusting chains 68.

Figures 4, 5, 6, 7:
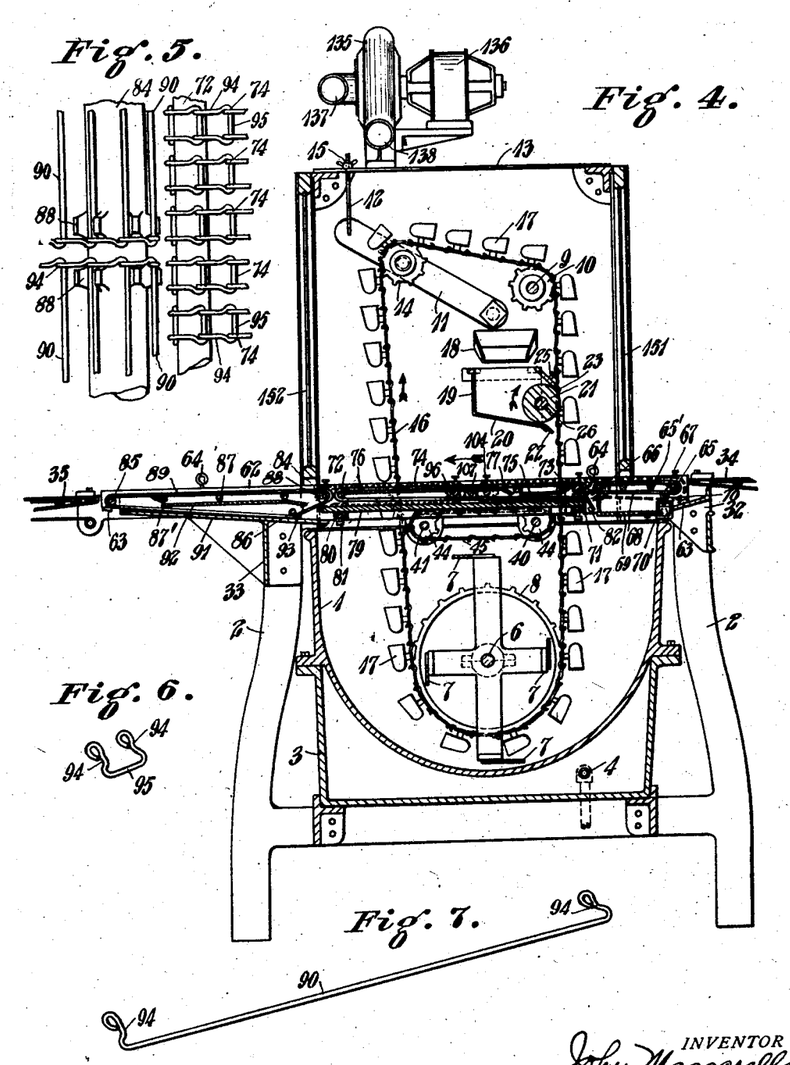
Fig. 4 is a vertical lengthwise section on the plane of the line 2—2 of Fig. 1, looking to the right.
Fig. 5 is an enlarged partial plan view of parts of two of the conveyor sections and driving and supporting means thereof.
Fig. 6 is a detail perspective view of one of the narrow chain links.
Fig. 7 is a similar view of one of the wide chain links.

The third, or finishing section succeeds the coating section at the rear, and comprises the front roller bar 84 and the rear roller bar 85 which is near the rear ends of the side bars 62. Also, there is a lower front roller bar 86, slightly below and to the rear of the bar 84; and the intermediate roller bars 87. All of these bars are journaled in the side bars 62 as in the other sections. In Figs. 1 to 9, however, the chain in this last section is different from that in the first two; being in the form of ladder chain with very long cross pieces (Fig. 7). Thus, as seen in Fig. 9, where such chain is shown diagrammatically, on a small scale, there are only two such chains running parallel, each of about half the width of the conveyor; and the sprocket wheels 88 that mesh with these chains 89 are at the opposite sides of the respective chains, as indicated in Fig. 5, leaving the cross pieces 90 entirely free in their upward passage at the front end of the section, where they receive the confections from the coating section. These ladder chains 89 pass to the rear around the rear roller bar 85 and then forwardly down along the forwardly inclined bottom of the drip trough 91 and under the lower front roller bar 86, thence up to their sprocket wheels 88 as inclined direction. The trough 91 discharges into the reservoir 1, and the chains 89 act as scrapers to carry drippings from the trough. The distributing plate 79, before described, extends back under the stretches of the chains 89 from the bar 86 to the sprocket wheels 88, with its rear end very close to these chains, but not over the front end of the drip trough 91. A shield plate 92, similar to the shield plate 76 of the coating section, lies under the intermediate roller bars 87, with its front end part 93 inclined down forwardly At the rear end of the plate 92, a brush 87′ bears up against the lower sides of the upper stretches of chain, to remove accumulation of excess coating congealing thereon.

Figure 10:
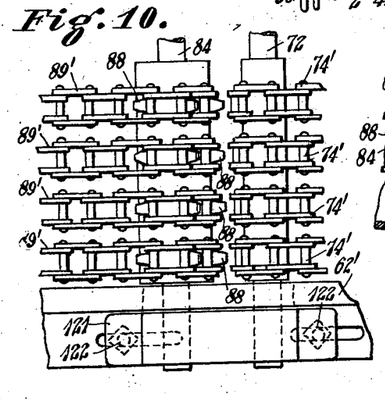
Fig. 10 is an enlarged partial plan view corresponding to Fig. 5, showing modified conveyor sections.
Figure 11:
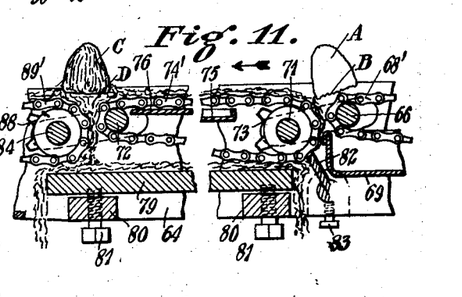
Fig. 11 is an enlarged partial vertical lengthwise section, corresponding to Fig. 4, but showing the modified conveyor sections such as shown in Fig. 10, and also illustrating the operation of these sections or those of the example of Figs. 1 to 9, inclusive, intermediate parts being broken away and omitted for lack of space.

In Figs. 10 and 11, the finishing section is made up of chains like those of the first two sections. Also, in Figs. 1 to 9, inclusive, the chains of the first two sections are narrow ladder chains, composed of links like that shown in Fig. 6, assembled as in Fig. 5; side parts 94 having eyes embracing cross parts 95 of succeeding links. The wide ladder chains 89 are developments of these, differing merely in that the cross parts 90 are much longer. The narrow ladder chains are found on the market. In Figs. 10 and 11, the chains are the stud-and-link kind used, for example, on bicycles; being much heavier than the wire ladder chains. Such chains, however, serve the same purpose, broadly, as the other kind in the previous examples; and they are numbered 68′, 74′ and 89′, respectively, in the dusting, coating and finishing sections shown in this example of Figs. 10 and 11, to indicate their correspondence in this respect. Each kind of chain, the stud-and-link, or the narrow ladder, or the wide ladder chain, has its advantage under different circumstances, as later will be described; and it will be understood that the wide ladder chain can be used for the finishing section in a conveyor having stud-and-link chains in its first two sections, according to my invention. Also, Fig. 11, although showing different chains, illustrates the operation of the conveyor with either kind of chain, for certain purposes, as will be described.

Figure 8:
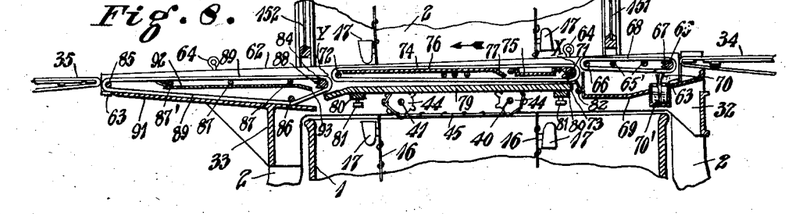
Fig. 8 is a partial vertical lengthwise section, corresponding to Fig. 4, showing a modification of the arrangement of the conveyor sections.

In Fig. 8, the construction of the conveyor is substantially as just described, and may include either kind of chain as just described. Here, however, the first or dusting section, the second or coating section, and the third or finishing section, are placed on successively lower levels, so that confections going from one to the other must tilt down and then right themselves at the passages X and Y, for the purpose of better deposit on the bottoming material, as will later be described. It will be understood that the conveyor can be made with the bearings adjustable up and down to effect this arrangement; or a conveyor can be made permanently different in this respect from those of the other examples, according to my invention. Such bearing adjustments, being simple and readily provided by a mechanic, need not be illustrated or more particularly described herein.

For driving the conveyor sections of any of these examples, yet allowing the conveyor to be removed readily from the rest of the machine, a shaft 96 is journaled across in the side bars 62 of the conveyor frame, about midway of the length of the middle or coating section, extending between the upper and lower stretches of the chains thereof, and extending outside the conveyor frame at the left, where it has fixed on it a worm wheel 97 to mesh with the worm 61, before described, when the conveyor is laid down in position for operation. At left and right, outside the bars 62, this shaft carries sprocket wheels 98 and 99; and the front roller bar 84 of the third or finishing section projects out at both sides and carries sprocket wheels 100 and 101, with sprocket chains 102 and 103 passing around them and around the wheels 98 and 99, respectively. Another shaft 104 extends across just forward from the shaft 96 that has the worm wheel; and out at the right, carries a spur gear 105 meshing with an idler gear 106 on a third shaft 107 between and parallel with the shafts 104 and 96; this idler gear 106 meshing with a spur gear 108 fixed on the first one of these three shafts, out past the right hand sprocket wheel 99 thereof. At left and right, outside the bars 62, the other shaft 104 carries the sprocket wheels 109 and 110, respectively, with chains 111 and 112 around them and around respective sprocket wheels 113 and 114 carried by outward extensions, at left and right, of the front roller bar 71 of the middle or coating section. Inside the frame bars 62, at left and right, this roller bar 71 carries the sprocket wheels 115 and 116 with chains 117 and 118 passing around them and around sprocket wheels 119 and 120 at the respective sides, on the front roller bar 65 of the first or dusting section, just inside of the side bars 62. The arrangement of all of these driving chains is best seen in Fig. 9.

In Figs. 10 and 11, the adjacent roller bars of meeting sections are journaled in a common bearing block 121 adapted to be clamped, by bolts 122, at different positions along the modified frame bars 62'. This permits stretching of the chains; the aggregate amount taken up being provided for by having the terminal bearing at one end or the other of the conveyor, as the bearing of the roller bar 65 at the front, or the bearing of the roller bar 85 at the rear, adjustable along the conveyor. This is fully set forth and is claimed in my Patent No. 1,417,086, issued May 23, 1922; as is also the construction of the conveyor generally, including the distributing means before described, in conjunction with other parts of the machine, which, in various respects, I have improved as set forth herein.

This distributing means is modified in Fig. 3, as also is disclosed and claimed in said application; having, instead of the plate 79, an endless web 79', which will be understood to be as wide as the conveyor, running around a driving roller 123 fixed on a shaft journaled in a bracket 124 and having a sprocket wheel with a chain 125 passing around a sprocket wheel on one of the conveyor shafts such as will cause the web 79', hanging down in the coating material in the reservoir 1, to carry up some of the material and pass it to the coating conveyor chains 74. The bracket 124 is adjustable up and down, as held by bolts 126 in a vertical slot in the reservoir side; so that the web 79' will pass more or less closely to the chains 74. This example also differs from those before described in having the sprocket-wheel or driving roller bars at the rear ends of the sections, as the bar 66' of the dusting section shown in Fig. 3. Where the plate 79 is used, it is preferable to have the sprocket-wheel roller bars at the fronts of the sections, to provide the greater diameter there, for the coaction of the front, upwardly passing parts of the chains with the plate 79, in the coating and finishing sections. In the modification of Fig. 3 this is not so needful.

To the rear of the fountain 19 is the blower nozzle 127; a cylindrical shell across the width of the conveyor, with a lengthwise slot 128 in its bottom, which slot is widened or narrowed by drawing the adjacent ends of the shell plate farther apart or closer together by small bolts 129 (Fig. 2). The righthand end of this shell is closed, but at the left the shell extends into a box 130 on the frame side 2. The side 131 into which the shell extends is adjustable up or down on the box, fitting behind flanges 132 along the upright corners; and the shell is hung on a suspension rod 133 extending up through the top 13 of the machine with a nut 134 above the top. Thus the shell may be set higher or lower to bring its slot farther from or closer to the confections passing thereunder on the conveyor. Mounted on the top 13 of the machine is the blower 135, driven by the motor 136. This blower operates centrifugally, taking in air through a pipe 137 leading from the interior of the machine through the frame side 2 just above the box 130, upward, and over to the center of the casing of the blower 135; and discharging the air through the pipe 138 leading from the lower peripheral part of the blower casing, across the top and down into the upper part of the box 130, through the frame side 2. Where this pipe 138 leads in, however, it has a damper 139 slidable across it in guides 140 which attach the end of the pipe 138 to the frame side 2. By opening this damper 139 more or less, the discharge of air through the nozzle slot 128 is increased or diminished; and the centrifugally acting blower 135 permits of this without varying the speed of the blower, and dispensing with a rheostat for the blower-driving motor 136. It will be understood, however, that a rheostat may be used, either with or without the damper.

For maintaining the desired temperature of the coating materials and confections, a gas burner 141 is mounted across under the front end part of the conveyor, fed by a pipe 142; and another burner 143 is similarly mounted across under the drip trough 91, fed by a branch pipe 143'. Also, just above the back of the fountain 19, a gas burner 144 extends across, with its orifices opening downward, inside a casing 145; being fed by another branch pipe 146. Valves 147, 148 and 149 control the gas supply to the burners 141, 143 and 144, respectively; and a valve 150 controls the entire gas supply.

To retain the heat within the machine, window sashes 151 and 152 are mounted to slide up and down in guides near the frame-side edges, at front and rear, respectively; this being well known in the art, the sashes resting far enough above the conveyor to allow passage of the confections; and, being transparent, allowing inspection of the interior operation without opening the machine and thus disturbing the temperature therein. The hopper 153 at the right hand side, leading down into the reservoir 1, and closed by the slide cover 154 (Fig. 9,) permits insertion of material into the reservoir without otherwise opening the machine, as also is known in the art.

*Operation.*—For coating confections of sugar or the like with materials such as chocolate or icing, the ladder chains of Figs. 1 to 9, inclusive are preferable. For chocolate coating, the stud-and-link chains of Figs. 10 and 11 may be used; the advantage of the ladder chain in this instance being only its lightness and consequent inexpensiveness. But for coating with icing, which is of a sticky and sleek nature, resembling white of egg in its behavior, I have found that the heavier, closer chains are less suited than the lighter, more open chains. This is especially true as to the third or finishing section of the conveyor, where the bottoming of the confections, if of icing of such nature, is pulled off by the heavier closer chains such as those of Figs. 10 and 11; and even the close ladder chains, such as used on the first and second sections in Figs. 1 to 9, inclusive, act in this objectionable manner. It is for this reason that I have devised the wide ladder chains 89 for the third section; presenting only the thin cross parts 90 to receive the coated confections, spaced as far as possible from each other without allowing the confections to tilt over, but thus presenting a minimum of supporting surface to the confection bottoms and affording a minimum of chance for the sticky, sleek bottom icing to cling to the conveyor and be pulled from the confections. Such a wide ladder chain also serves satisfactorily for receiving confections coated with the more readily managed materials, such as chocolate; so that a machine so equipped may be used for either kind of material. When changing from one material to the other, or after any use of the machine, when it is to remain out of use for a while, thorough cleaning of the reservoir 1 and all of the parts therein below the conveyor is permitted, by ready removal of the conveyor, lifting it by its handles 64 without the use of any tools, as before described. Thus, the machine not only is suitable for working the widely different coating materials, but is very readily cleaned for changing from one material to the other.

For coating such confections as above mentioned, the tray 75 and shield plate 76 are not so much needed; nor is the shield plate 92. These are especially desirable if the machine is used for coating confections of very sensitive substance, such as ice cream, with chocolate or the like. The tray 75 catches some of the coating and adds to the bottoming effect; and the shield plate 76, up close to the chains 74, prevents too ready escape of surplus coating, conserving the bottoming, and also shields the confection from air drafts and permits of nicer regulation of temperature. I find, in coating ice cream on a conveyor, that if the ice cream is permitted any substantial contact with the conveyor parts, it freezes thereto and prevents the coating from running under it; hence the provision, such as the tray 75 and plate 76, for insuring an ample flood of coating under the ice cream from the beginning of the coating operation. Also, it will be understood that the chocolate or other coating for a frozen body such as ice cream must not be too warm; it must be such as to set very quickly without materially melting the frozen body. Hence the provision for nice temperature control at the conveyor, such as the shield plate 76. Under these circumstances, I also find that the heavier, closer chains of Figs. 10 and 11 are more suited for this coating of frozen bodies, such as ice cream; as the ample mass of the conveyor parts is less responsive to varying temperatures in their vicinity, and the closeness is more suited to the need of holding an ample bottoming supply on top of the conveyor.

Since the light ladder chain, especially the wide chain of this kind in the finishing section, is more suited for icing, but the heavier chain of Figs. 10 and 11 is more suited for coating ice cream or the like, the same conveyor is not interchangeable as between these two uses as it is between the use of icing or chocolate for coating, as before noted. In fact, the ice cream coating is not done by the confectioners using machines for the other confections, as a rule; so that this lack of interchangeability is not material, usually. However, it will be seen that, owing to the easy removal of the conveyor as a whole, a single machine may be provided with the two kinds of conveyors, either one of which may be inserted, for doing either kind of work. If a conveyor is not to be used for coating ice cream or the like, its tray 75 and plates 76 and 92 may be omitted, as before noted; or these may be found of advantage with the other kinds of work.

In any of the instances, the distributing plate 79, or its counterpart, the web 79' of Fig. 3, assists in the operation as fully disclosed and claimed in my before mentioned copending application.

With the conveyor chains tightly stretched, either in the original construction as in Figs. 1 to 9, inclusive, or by the use of adjustable bearings, as in Figs. 10 and 11, permitting repeated adjustments if the chains become slack in use, the upper stretches are practically straight, although the driving tension comes on the lower stretches, as is preferable when the plate 79 is used, as before noted. The arrangement of the driving roller bars, with the sprockets, at the receiving ends of the sections, leaving the roller bars at the leaving ends merely to act as the guides and supports at those ends, presents the relatively large sprocket wheels 67 to the feed belt 34, where the abrasion of the bottom of the uncoated confection A incident to the slight retarding in the gap is abraded by the belt 34. This effects a slight roughening of the bottom, permitting better adhesion of the coating. This also occurs, due to the above arrangement of the driving roller bars, at the passage from the first or dusting section to the second or coating section, as clearly shown in Fig. 11, where the bottom B of the uncoated confection A is additionally roughened by the rubbing of the chains 68 while the confection is tilted down and slightly retarded in the gap caused by the passage of the coating chains 74 around the relatively large sprocket wheels 73. This retarding is of very short duration, as the confection soon is worked over onto the coating chains 74.

The coating material, brought up by the conveyor buckets 17 from the reservoir 1 and emptied into the trough 18 and from there into the fountain 19, is gradually carried up and over forward by the roll 21 rotating as indicated by the arrow (Figs. 2 and 4) to contact with the leaf 23, which permits a desired proportion to escape and travel down on the roll 21 to contact with the slide 22, which scrapes off the coating to run in the form of a curtain down from the inclined slide 22 onto the conveyor and onto the confections carried thereby, thus evenly coating the sides and tops of these confections, to a thickness that is nicely controlled by adjustments of the leaf 23 and slide 22 of the fountain 19.

The surplus coating runs through the chains 74 or 74', onto the distributing plate 79, there spreading evenly throughout the extent of the plate and running from its edges back into the reservoir 1, from which it is used again. But where this coating runs over the front and rear edges of the plate 79, it contacts with the upward passing chains 74 and 89, or 74' and 89', and some of the coating thus is carried up on the confection-receiving sides of these chains. During its distribution over the surface of the plate 79, this coating has cooled slightly, so that such parts of it as are thus brought up are of slightly thicker and more clinging consistency than when just discharged from the fountain 19. That brought up by the chains 74 or 74' thus meets the oncoming uncoated confection A, which is deposited thereon, and in its slightly more tenacious nature, this carried-up and reapplied coating clings firmly to the confection bottom and provides a more adequate coating for the bottom than is had by mere dependence upon some of the material dropped on the conveyor running under the confection, or upon any application of coating to the conveyor at practically the reservoir temperature and consistency. The scraper 82 may be used to regulate the thickness of this coating thus carried up and reapplied.

With the web 79' of Fig. 3, the coating is somewhat cooled while it occupies the web in passing up from the contents of the reservoir 1, so that it is applied to the chains 74 or 74' with substantially the same results as in the other example; and the scraper 82 here functions in the same manner. The plate 79 is preferred, however, as being simpler, and affording a wider range of consistency for the bottom coating thus applied.

During its occupancy of the coating conveyor section, while receiving its top and side coating as before noted, the confection is practically supported on the coating material that came up from the plate 79 or web 79', and not directly on the conveyor chains. The advantage of this, due to the plate or web, will be apparent in the coating of the frozen bodies, such as ice cream, where, as before noted, substantial contact of the frozen body with the conveyor elements causes trouble by the freezing of the body to the conveyor. These provisions thus coact with the tray 75 and plate 76 when these are used for such work. Ice cream to be coated usually is in the form of bars traveling lengthwise; so that in passing the gap from the first to the second section, or from the feed belt 34 to the first section if fed in that way, they do not tilt down, and do not become abraded, as is not necessary for such frozen substance. Also, of course, the dusting function of the first section is not needed for frozen confections; but this section may be used as the feed belt, instead of the belt 34. For molded centers. moistening by the wick 70 aids in bottoming.

In passing from the coating section to the finishing section, the confection C (Fig. 11) now coated on top, sides and bottom, does not tilt down and become momentarily retarded as at first, because here the coating chains 74 or 74', going down with their surplus coating material, oppose this material to that being brought up by the finishing section chains 89 or 89' from the rear end part of the plate 79 where it extends under these chains. The result is a tide of the coating material, as at D in Fig. 11, on which the coated confection practically floats across the gap from one section to the other, and takes on some additional bottom coating of slightly cooled and more clinging consistency instead of losing coating in passing the gap without such a tide therein.

The third or finishing section, being outside the machine enclosure, less subject to the heat of the main supply of coating material, permits the confection to cool; and at the same time, with its coating carried up from the plate 79, it further conserves or adds to the bottoming. Owing to the coolness, this coating additionally applied to the bottoms will be especially firmly and fully attached; so that when the confection finally passes from this section to the delivery belt 35, the bottom coating is heavy and firm enough not to be squeezed out from under the confection by the weight of the confection itself, and not to unduly adhere to the belt or to the plaque or other means provided there for receiving the completed confections, and upon which, as usual, the confection is carried for some distance exposed to the air, so that the coating receives its final hardening, permitting the confection to be handled freely without injury thereto.

If a web 79' is used as in Fig. 3, it will be understood that another such web may apply coating to the finishing section somewhat as the rear end part of the plate 79 does as above noted.

The above described functions of the finishing section are especially well exemplified in coating with chocolate or the like, with either kind of chain, especially with the heavier chains of Figs. 10 and 11, and in thus coating either candied or frozen confections. With icings of fugitive consistencies, as before described, using the wide ladder chains, the more important function of the finishing section is to receive the coated confections and carry them until their coatings are sufficiently hard for delivery to the delivery belt 35, without pulling off the bottom coating, as before noted; although bringing up additional such coating, by aid of the plate 79, or a web 79', is of advantage in providing the flood or tide at the gap as described. The thin elements of such wide ladder chains of course are not so adapted for this bringing up as the closer narrow ladder chains or stud-and-link chains, should these be used in the finishing section, as is preferable for the more readily managed coatings, such as chocolate.

The finishing function of the last section is present with a coating that is softened by heating and hardened by cooling, as just described, but is practically realized with any other coating, as for instance a solution or paste that hardens merely by exposure to air, which, in fact, is largely true of icings of sugar or the like; since the third or finishing section fully exposes the confection to this hardening influence, whether it be cooling, drying, or chemical action.

By having the respective conveyor sections made up of a plurality of parallel endless chains, it is feasible to have these chains strong and durable and presenting a practically level conveying surface, whereas a web continuous from side to side as well as lengthwise, must be of comparatively light material, such as thin wire, found in practice to warp and twist so that the conveyor is not level or uniform and does not permit of accurate regulation of the coating operations hereinbefore described, and is so weak as to soon wear out, and breaks frequently, necessitating stoppage of the entire coating system until it can be repaired or renewed. To make such a continuous web of sufficiently heavy material, such as the chains of my invention are made of, is to impose unequal strains in different parts, due to the unavoidable slight inaccuracy of the various parts of such a continuous structure, which would result in a conveyor that would be warped and twisted in the making, and which would pass very stiffly around the supporting elements. By having the chains separate, as in my present invention, and as claimed broadly in my copending application before mentioned, each chain can adjust itself to its own supporting means, independently of the others, and these discrepancies do not become manifest.

Such heavy conveying elements as this chain, of either kind, or other suitable chain which might be used, is especially applicable to the combination in which it is most feasible to have the upper stretches of the chains pass from their driving sprockets to their idler roller bars, because its greater strength allows it to be stretched very tightly without breakage, so that the upper stretch is practically straight although not the tension stretch. Such an arrangement, thus permitted, therefore lends the advantages set forth herein; but such chains may be used in various other relations, and other constructions may be employed for the sectional conveyor, as has been alluded to herein.

The location of the shield-plate 76 under the blower outlet 128 results in the blower discharge raising waves in the coating flowing over the conveyor and carried along therewith; these waves being due to the opposition of the plate 76 to the air currents from the blower. The confection centers float on these waves, which also roll up over the sides and tops of the centers. The blower blows off the surplus coating from the sides and tops, but not from the bottoms; so that this wave production and consequent floating results in very heavy bottom coating, due to the coaction of the plate 76 and the blower. This is especially valuable in coating frigid materials as before mentioned, where all walls of the coating must be substantially thick; and the efficiency of the bottom-coating arrangement therefore is especially important.

The brush 87' against the upper stretches of chains in the third or finishing section also are especially of advantage in connection with coating frigid articles, such as ice-cream bars. These articles chill the finishing section chains, and these chains in turn chill the surplus coating remaining thereon from drainage of the confections, so that this surplus coating does not run off readily into the trough 91. The brush 87' brushes off this partly congealed coating; and it preferably is located at the end of the shield plate 76 so that coating dropping from the brush does not collect on the plate 76, but falls directly into the trough 91. Also, heated air currents, caused by the burner 143, pass up from under the plate 76 around the brush, tending to keep the coating thawed therefrom.

The step-down arrangement of the sections in Fig. 8 is of advantage, especially where bottoming material is brought up, either with use of a plate 79 or a web 79', in setting the confections down more directly, rather than sliding them onto the receiving coating material as where the chains are all in the same plane. It will be understood that this arrangement may be used for any of the kinds of confections or coatings, and may employ such kinds of chains as may be desirable under the circumstances, as described for the other examples; in fact, any of the other conveyors may be made adjustable, to effect this arrangement, as previously alluded to.

Other modifications of any of the various parts of the machine described and shown specifically herein may occur in practice; or parts may be omitted, or otherwise combined, or altered, within desirable limits under varying circumstances.

Therefore, while certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In a machine of the character described, a coating conveyor section and means for softening the coating material adjacent to this section, a distinct conveyor section removed from the direct influence of said softening means, receiving the confections from the coating section for hardening of the coating material thereon, a shield plate under the conveying portion of said distinct section, means near one end of said plate, against said distinct section, to remove surplus coating material tending to harden thereon, and softening means near said distinct section, within the extent of said plate, to modify the hardening action on the coating of the confections and on the coating material engaged by said removing means.

2. In a machine of the character described, a coating conveyor section and means for softening the coating material adjacent to this section, a distinct conveyor section removed from the direct influence of said softening means, receiving the confections from the coating section for hardening of the coating material thereon and comprising a series of relatively long and narrow transverse bars, and means to supply additional material to the confections on this distinct section.

3. In a machine of the character described, a coating conveyor section and means for softening the coating material adjacent to this section, and a distinct conveyor section removed from the direct influence of said softening means, receiving the confections from the coating section for hardening the coating material thereon, said distinct section comprising a series of relatively long and narrow transverse bars.

4. In a machine of the character described, a container for coating material, an agitator in said container, a conveyor running over said container from end to end thereof, an elevator operatively connected to said agitator in said container and extending up past one side of said conveyor, and driving means for said conveyor at the opposite side of said conveyor, operatively connected to said elevator across the top of said conveyor.

5. In a machine of the character described, a container for coating material and mechanism therein for acting on said material, a feeding conveyor running toward one end of said container, a delivering conveyor running from the opposite end of said container, operating mechanisms extending above said container near opposite sides thereof, and an intermediate conveyor running from said feeding conveyor to said delivering conveyor over said container, between said mechanisms, said intermediate conveyor being mounted for removal endwise of said container and upward over one of the other conveyors.

6. In a machine of the character described, a container for coating material and mechanism therein for acting on said material, a feeding conveyor running toward one end of said container, a delivering conveyor running from the opposite end of said container, elevating mechanism extending up out of said container near one side thereof, conveyor driving mechanism extending above said container near the opposite side thereof, and an intermediate conveyor running from said feeding conveyor to said delivering conveyor over said container, between said mechanisms, said intermediate conveyor being detachably operatively connected to said conveyor driving mechanism and being mounted for removal endwise of said container and upward over one of the other conveyors.

7. In a machine of the character described, a conveyor, means for driving said conveyor, respective means operatively connected to said driving means for driving feed and delivery means for said conveyor, and distinct controlling means, respectively, for the conveyor driving means and for the operative connection of said feed and delivery driving means, located together on one side of said machine.

8. In a machine of the character described, a conveyor, a frame for said conveyor in which said conveyor runs along said frame, a mounting for said frame whereby said conveyor may be moved, driving means in said machine comprising a worm, and driving means for said conveyor, on said frame, comprising a worm wheel to mesh with said worm when said conveyor is in operative position on its mounting, or to unmesh from said worm to permit the conveyor to be moved.

9. In a machine of the character described, a conveyor comprising a plurality of longitudinally succeeding sections, a frame operatively supporting said sections and comprising longitudinal side bars, a sprocket connection from one of said sections to another inside said frame bars, and a sprocket connection from one of said sections to another outside said frame bars.

10. In a machine of the character described, a coating conveyor section, means to supply coating to this section, a conveyor section to supply confections to said coating conveyor section, and means to supply moisture to said supplying section to facilitate the adhesion of coating material to the bottoms of said confections.

JOHN MASSARELLA.